2,908,608
PROCESS OF ALLEVIATION OF BLOAT IN RUMINANTS USING CITRIC ACID ESTERS

Herbert G. Luther, Terre Haute, Ind., assignor to Chas. Pfizer & Co., Inc., New York, N.Y., a corporation of Delaware No Drawing. Application July 2, 1957
Serial No. 669,473

3 Claims. (Cl. 167—53)

This invention relates to an improved process for the alleviation of bloat in animals. More particularly, it is concerned with the use of citric acid esters for this purpose. These compounds are effective antibloating agents upon administration to animals afflicted with this condition.

Bloat is a common digestive disorder of ruminant animals, such as cattle, sheep and goats, caused by the distention of the stomach with gas. The immediate cause is often the eating of a large quantity of easily fermentable feed, such as fresh clover and alfalfa pasture. The occurrence of bloat has increased substantially in the past decade, a reflection of changes in management and feeding practices as well as a large increase in acreage of legumes. The most serious loss from bloat to many dairymen and cattlemen is the loss in milk production and the slower gains in weight that usually follow recovery from severe bloat. Present losses due to bloat in cattle in the United States are estimated to be about fifty million dollars annually. Bloat causes the most trouble in areas where it is a common practice to pasture on legumes, especially alfalfa and clover. Furthermore, it is more prevalent in dairy cattle than in beef cattle due to the fact that approximately 60% of the dairy cattle are pastured on legumes compared with about 30% of the beef cattle. Nevertheless, when beef cattle are pastured on legumes they develop as much bloat as dairy cattle. As a result of all these factors, it has been estimated that a farmer suffers a normal bloat loss on cattle that can mean the difference between success and failure in a feed lot operation.

In view of the fact that the bloat problem has not yet been successfully solved and in view of the serious nature of the problem as described above, it is the object of the present invention to provide an all-purpose product which effectively neutralizes the bloat present in cattle. The compounds included within the scope of the present invention are chosen from the group consisting of lower trialkyl esters of citric acid and acetyl derivatives thereof, wherein the alkyl group has from one to eight carbon atoms, such as trimethyl citrate, triethyl citrate, tripropyl citrate, tributyl citrate, trihexyl citrate, tri-2-ethylhexyl citrate, trioctyl citrate and the acetyl derivatives of all these compounds. These triesters of citric acid afford a good response when administered either orally or intrarumenally. The preferred compounds are triethyl citrate and acetyl tributyl citrate.

In accordance with the prior art, a number of methods have been suggested for the treatment of bloat, but they all have a number of disadvantages. For example, turpentine and phenol preparations or coal tar derivatives are commonly used in the treatment of bloat, but they do not reduce the amount of gas formed. Methyl silicone has been reported to be an effective treatment in bloat as it is a defoaming agent that tends to change the surface tension of liquids; however, all bloat is not due to frothing and this particular defoaming agent is not effective in the critical stages of bloat. In acute cases, time is of the utmost importance so that an emergency rumenotomy is the best effective method of treatment.

In accordance with the present invention, it has been unexpectedly discovered that both triethyl citrate and acetyl tributyl citrate are extremely effective for the treatment of frothy bloat when administered intrarumenally in dosages in the range of from about five to about 50 ml. per 500 lb. of animal weight. Furthermore, these substances are superior to those in the prior art with respect to this debloating action and do not possess the disadvantages which attend the use of the latter; for example, these compounds are both non-toxic and odorless and are relatively inexpensive. Furthermore, they exert no detrimental effect on rumen flora or cellulose digestion. In accordance with the process of this invention, the compounds described herein are administered to the animals either by means of injection into the rumen or by the oral route wherein the desired compounds are in the form of gelatin capsules.

A preferred embodiment of the foregoing process involves the daily oral administration of the desired amount of citric acid ester, either in the form of a gelatin capsule or by means of a stomach tube or drench, before the ruminants are turned on pasture. When a dosage of about 20 ml. is employed, triethyl citrate and acetyl tributyl citrate are both found to be highly effective therapeutically. In general, it can be said that gas bubbles throughout the ingesta are dispersed within a time period varying from about 15 to 24 minutes. Thereafter, the gas was belched freely by the animal.

In particular, many cases of frothy bloat have been treated intrarumenally with dosages in the range of about five to about 50 ml. of acetyl tributyl citrate. Reduction of bloat occurred in all cases within 15 to 30 minutes following injection. The results in vivo support the in vitro work wherein it is demonstrated that a very rapid rate of froth reduction occurred with this compound. For example, acetyl tributyl citrate releases gases entrapped in froth in about three to about six minutes; prompt deflation occurs in about twenty minutes through normal eructation, and even faster relief is possible through the use of a stomach tube or trocharization, even in frothy bloat. The preferred dosage range for either oral or intrarumenal administration in cattle is about 20–30 ml., the lower dosage level being sufficient for satisfactory results; while for sheep and goats it is about 5–10 ml., and the dose may be repeated in one hour, if necessary. Hence, it can be concluded that the herein described compound is an excellent therapeutic in frothy bloat upon intrarumenal administration in animals.

This invention is further illustrated by the following examples, which are not to be considered as imposing any limitation thereon.

Example 1

The animals selected for these studies were chosen from a group consisting of approximately 90 head of Hereford beef cattle. The forage consisted of a pure stand of ladino clover. Prior to the bloat study, selected animals were subjected to a trial run on legume pasture to determine whether or not they were subject to bloat. Only those animals that bloated regularly were picked for the trial. The procedure for the production of bloat was rigidly performed. It consisted of turning the steers into pasture at 7:30 a.m. and returning them at 9:30 a.m. to the holding area. The steers remained in the holding area until 2:30 p.m. when they were again returned into a clover paddock and allowed to graze until 4:00 p.m. At this time, they were again removed to the holding area where they remain until the following morning at which time the same procedure was repeated. In all cases, the steers were grazed during every scheduled grazing period per day throughout the entire bloat season.

The acetyl tributyl citrate employed was available in 150 ml. multidose vials, each ml. containing 1 g. of the compound. The typical course of procedure for the evaluation of acetyl tributyl citrate was as follows: the amount of material to be tested was weighed out and placed in a gelatin capsule; at 7:15 a.m. before the steers are turned on pasture the test material was administered; records of the bloat patterns were accurately kept. The cattle to be tested each received 20 ml. of acetyl tributyl citrate per 2 lbs. of corn meal feed daily by weight. A group of 59 head of cattle were employed in this experiment. The results obtained indicated that bloat was completely reduced in about 15 to 30 minutes following the administration of acetyl tributyl citrate. In a similar manner, other dosages in the range of 10–50 ml. were employed; the results were substantially the same although optimum data were obtained at the 20 ml. level.

*Example II*

The procedure described in Example I was followed here except that the acetyl tributyl citrate was administered by means of injection into the rumen. The results obtained were similar to those described above and also agree substantially with the data obtained from studies performed in vitro.

*Example III*

The same procedure as described in Example I was followed here except that the treated cattle received 10 ml. of triethyl citrate daily per 1 lb. of corn meal feed. This compound was found to be as effective as acetyl tributyl citrate. It was also administered by means of direct injection into the rumen with similar results.

*Example IV*

The same procedure as described in Example I was followed here except that 120 head of Hereford cattle, grazing on legume pasture, were selected for the trial. Sixty cattle were given 2 lbs. of feed daily to which acetyl tributyl citrate was added at the rate of 10 g. per lb. The remaining sixty head received 2 lbs. of grain daily without any added chemical. It was found that during the five day period of time that this trial was conducted, bloat had been substantially reduced in the cattle given the citric acid ester.

*Example V*

The procedures previously described in Examples I, II, III and IV were employed here except that the compound administered was tri-2-ethylhexyl citrate; similarly, tripropyl citrate, tributyl citrate, trihexyl citrate and trioctyl citrate were also used. In addition, the acetyl derivatives of all these compounds, as well as acetyl triethyl citrate, were also employed. In all cases, the results obtained were in substantial agreement with the data reported in the previous examples.

*Example VI*

The same procedures as described in the previous examples were followed here except that each of the compounds was administered to sheep and goats in 5–10 ml. doses. The results obtained were similar to the data reported in the experiments with cattle.

What is claimed is:

1. A process for the alleviation of bloat in ruminant animals, which comprises administering to the animals a compound chosen from the group consisting of lower trialkyl esters of citric acid and acetyl derivatives thereof wherein the alkyl groups have from one to eight carbon atoms.

2. The process as claimed in claim 1 wherein the compound is triethyl citrate.

3. The process as claimed in claim 1 wherein the compound is acetyl tributyl citrate.

References Cited in the file of this patent

UNITED STATES PATENTS 2,485,631   Neal _____ Oct. 25, 1949

OTHER REFERENCES

Chem. Abst., vol. 47, 1953, p. 908c.